United States Patent [19]
Lemay et al.

[11] Patent Number: 5,274,825
[45] Date of Patent: Dec. 28, 1993

[54] MICROPROCESSOR VECTORED INTERRUPTS

[75] Inventors: Richard A. Lemay, Carlisle, Mass.; Michael D. Smith, Palo Alto, Calif.

[73] Assignee: Bull HN Information Systems Inc., Billerica, Mass.

[21] Appl. No.: 969,551

[22] Filed: Oct. 30, 1992

Related U.S. Application Data

[63] Continuation of Ser. No. 515,548, Apr. 26, 1990, abandoned, which is a continuation of Ser. No. 92,486, Sep. 3, 1987, abandoned.

[51] Int. Cl.$^5$ ............................................. G06F 13/00
[52] U.S. Cl. ...................................... 395/725; 395/800; 364/DIG. 1; 364/241.2; 364/241.5; 364/241.9
[58] Field of Search ................. 364/DIG. 1, DIG. 2; 395/200, 275, 325, 725, 800

[56] References Cited

U.S. PATENT DOCUMENTS

| | | | |
|---|---|---|---|
| 3,800,287 | 3/1974 | Albright | 364/200 |
| 4,030,075 | 6/1977 | Barlow | 364/200 |
| 4,240,140 | 12/1980 | Stafford et al. | 364/200 |
| 4,255,786 | 3/1981 | Holtey et al. | 364/200 |
| 4,953,072 | 8/1990 | Williams | 364/900 X |

OTHER PUBLICATIONS

European Patent Application EP-A-O 223,413 (Data General Corporation) Date of Publication: May 27, 1987.
UK Patent Application GB-A-2 110 442 (Western Electric Co.) Date of Publication: Jun. 15, 1983.
PCT International Application WO-A-82/02442 (Harris Corporation) International Publication Date: Jul. 22, 1982.

*Primary Examiner*—Paul V. Kulik
*Attorney, Agent, or Firm*—Gerald J. Cechony; Lewis P. Elbinger; John S. Solakian

[57] ABSTRACT

A data processing system includes a number of subsystems coupled in common to a system bus. The subsystems communicate with each other by sending commands to each other via the system bus. Channel numbers identify the subsystems. One subsystem includes apparatus for receiving commands requiring a priority interrupt by storing vectors in a random access memory. These vectors which are addressed by the channel number of the interrupting subsystem indicate the offset to be added to the base address of an exception vector table. The exception vector stores the starting address in a memory of the requested interrupt routine.

3 Claims, 4 Drawing Sheets

MICROPROCESSOR VECTORED INTERRUPTS

This application is a continuation, of application Ser. No. 07/515,548, filed Apr. 26, 1990, which is a continuation of Ser. No. 07/092,486, now abandoned, filed Sep. 3, 1987.

BACKGROUND OF THE INVENTION

1. Field of the Invention

This invention relates to data processing systems, and more particularly to apparatus for expanding the interrupt capabilities of microprocessors.

2. Description of the Prior Art

Microprocessors in general can accept a limited number of priority interrupts. As an example, the Motorola 68020 32-bit microprocessor has seven interrupt priority levels. Level 7 is the highest priority; level 0 indicates that no interrupts are requested.

As described in the "MC 68020 32-bit Microprocessor User's Manual-Second Edition", published by Prentice-Hall Inc., exception processing for interrupts is processed, wherein the microprocessor fetches a vector number from the interrupting device and displaying the level number of the interrupt being acknowledged on pins A1-A3 of the address bus. If the vector number is not generated by the interrupting device, then external logic requests automatic vectoring and the processor internally generates a vector number which is determined by the interrupt level number.

However in a data processing system having multiple processors and a large number of peripheral subsystems, the number of priority interrupts provided is too limiting.

OBJECTS OF THE INVENTION

Accordingly it is an object of the invention to provide an improved data processing system having a greater number of priority interrupts.

SUMMARY OF THE INVENTION

A data processing system includes a number of subsystems, all coupled in common to a system bus. These subsystems make up a conventional subsystem and in addition includes a non-proprietary subsystem (NPE). The non-proprietary subsystem executes non-proprietary applications software.

The NPE receives interrupt commands from other subsystems. These commands include a channel number of the NPE, the channel number of the requesting subsystem and a function code describing the operation the NPE is to perform. The NPE includes an interrupt identity register IIR which stores the channel number of the interrupting device.

Upon receiving the command, a central processing unit (CPU) in the NPE receives a priority request which is acknowledged if the CPU is not executing a command of higher priority.

When the command is acknowledged by the CPU, the channel number stored in the IIR is applied to the input address terminals of an interrupt vector array random access memory (RAM). The RAM stores 8 bit offset vectors in each location corresponding to each channel number.

An exception vector table stores pointers which are the starting address of an interrupt routine for processing the requested interrupt. A base address provided by the CPU is added to four times the offset vector value to locate the pointer in the exception vector table. This pointer is the starting address of the interrupt routine.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which.

DESCRIPTION OF THE PREFERRED EMBODIMENT

Figure 1:
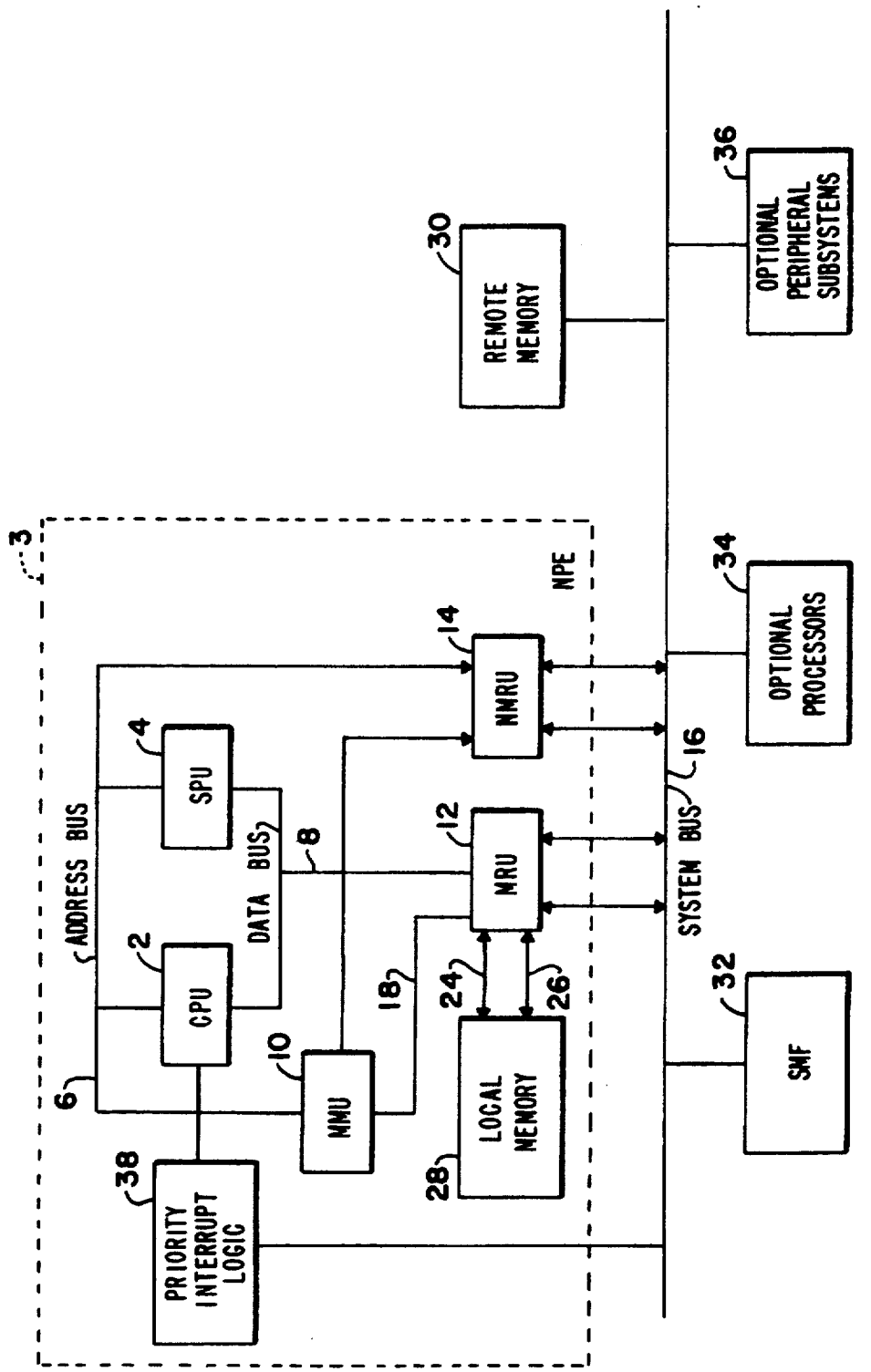
FIG. 1 shows a block diagram of the overall system and includes the detailed logic blocks of a non-proprietary subsystem.

FIG. 1 shows a block diagram of a data processing system 1 which includes a system management facility (SMF) 32, a number of optional processors 34, a remote memory 30, a number of optional peripheral subsystems 36 and a non-proprietary subsystem 3, all coupled in common to a system bus 16. The SMF 32 provides start-up and centralized control of the overall data processing system 1. The remote memory 30, the optional processors 34 and the optional peripheral subsystems 36 are conventional in operation.

The non-proprietary system (NPE) 3 which provides a family of platform systems onto which non-proprietary operating systems may be ported. This allows system builders to structure "solutions" by combining a wide range of off the shelf applications software with the standard software of the other conventional subsystems that make up data processing system 1. NPE 3 includes a central processing unit(CPU) 2, a scientific processing unit (SPU) 4, a memory management unit (MMU) 10 and a non-memory reference unit 14, all coupled in common to an address bus 6 and a data bus 8. A memory reference unit (MRU) 12 is coupled to data bus 8 and to MMU 10 by physical address bus 18. A local memory 28 is coupled to the MRU 12 via a data bus 24 and an address bus 26. The MRU 12 and NMRU 14 are both coupled to system bus 16.

The CPU 2 is typically a Motorola 68020 microprocessor which generates 32 address signals over address bus 6, receives or generates 32 data signals over data bus 8 and has a number of control leads. The SPU 4 is typically a Motorola 68881 floating point coprocessor. The SPU 4 and CPU 2 cooperate on the execution of floating point instructions. The CPU 2 fetches and decodes the instructions, computes the effective address and initiates operand references. The SPU 4 then executes the instructions.

A priority interrupt logic 38 processes interrupt commands received from system bus 16.

The MMU 10 is typically a Motorola 68851 paged memory management unit which receives logical addresses from CPU 2 via address bus 6 and generates physical addresses for transfer over bus 18.

The MRU 12 receives physical addresses from the MMU 10 and from system bus 16 and determines whether the local memory 28 or the remote memory 30 locations are addressed. If the transaction is a local memory write, the MRU 12 appends parity to each data byte received from the CPU 2 and stores it in the addressed location in local memory 28. If the transaction is a local memory read, the MRU 12 accesses the data from the addressed location, performs the appropriate parity checks and routes the data to the requesting CPU 2 or SPU 4 or to the system bus 16.

If the transaction is directed to the remote memory 30, then the MRU 12 sends out address, control and data information on system bus 16 for a write operation to remote memory 30. For a read operation the MRU 12 sends the address and control information out on the system bus 16. In this case, the data information (channel number) identifies the sending unit. The response command, therefore, during the second half bus cycle will include the requested data as well as the address of the requesting unit, the channel number.

The MMU 10, MRU 12 supports eight, sixteen, twenty-four and thirty-two bit wide transactions (1, 2, 3 and 4 bytes).

The NMRU 14 controls all non-memory commands including internal NPE 3 (local) non-memory commands and all non-memory commands on the system bus 16 (remote). Local non-memory commands make a number of registers available to the programmer. Remote non-memory commands make available to the programmer a number of registers in the controllers coupled to system bus 16.

Figure 2:
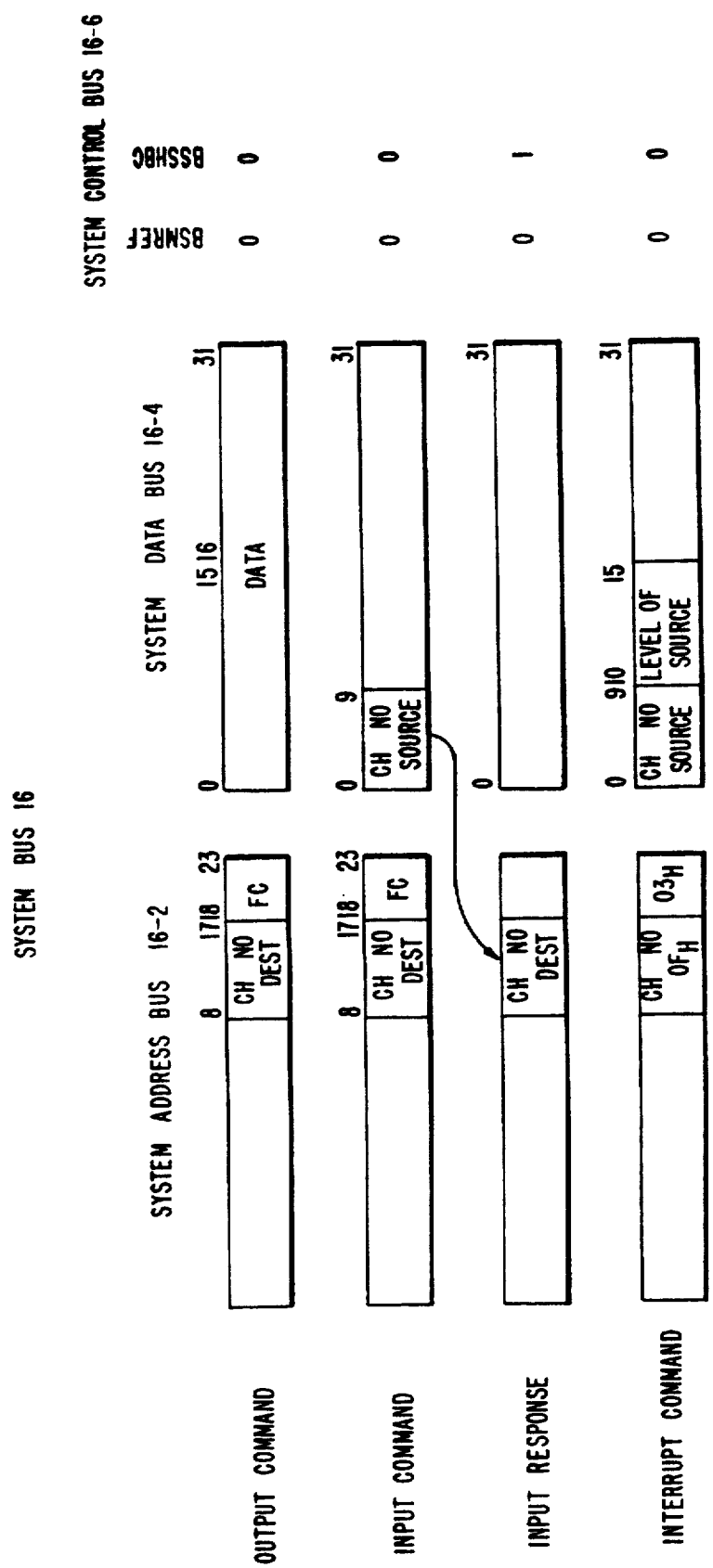
FIG. 2 shows the format of some of the commands sent over the system bus.

FIG. 2 shows the format of some typical non-memory commands. An output command, that is one subsystem coupled to system bus 16 sending data to another subsystem coupled to system bus 16, includes the channel number of the receiving subsystem in address bus 16-2 bit positions 8 through 17, a function code in address bus 16-2 bit positions 18 through 23 and data in data bus 16-4 bit positions 0 through 31. Among the control signals on control bus 16-6 are a memory reference signal BSMREF, indicating that this is not a memory 30 command, and a second half bus cycle signal BSSHBC indicating that this is not a response to a previous command. Each subsystem will respond to its unique channel number. The function code indicates the operation the receiving subsystem will perform.

Also shown is an input command with its input response. Note that data bus 16-4 bit positions 0-9 specify the channel number of the sending subsystem. This channel number will appear in the input response command in address bus 16-2 bit positions 8 through 17. Note that signal BSSHBC indicates that this is a response to a previous input command.

The interrupt command is processed by the elements of this invention. The command includes the channel number hexadecimal 0F of the NPE 3 and a function code of hexadecimal 03. The data bus 16-4 includes the channel number and the interrupt level of the interrupting subsystem or device within the subsystem.

The NPE 3 will process this interrupt if its interrupt level is greater than the current level of the program being executed by CPU 2.

Figure 3:
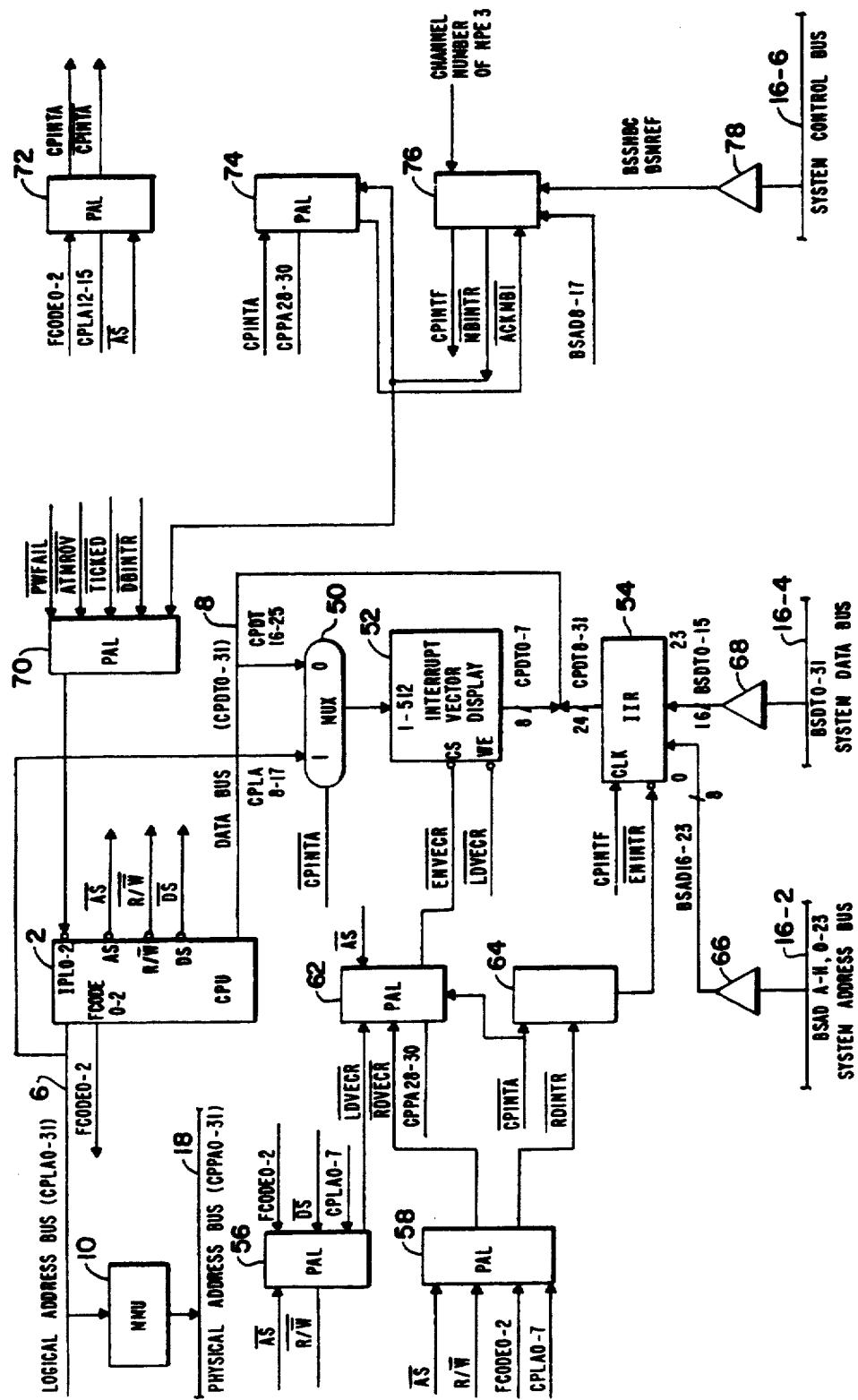
FIG. 3 shows the detailed logic that processes the priority interrupt.

Referring to FIG. 3, all commands on the system bus 16 are received by the NPE 3. The channel number signals BSAD 8-17 which are received via address bus 16-2 and a driver 66 are applied to logic 76. The channel number of the NPE 3 is set by switches (not shown). Also control signals BSSHBC and BSMREF are applied to logic 76 via control bus 16-6 and a driver 78. If signals BSAD 10 through 17 indicate a channel number of hexadecimal 0F, then signal ITSAME goes low.

Then if signals BSAD 8, BSAD 9, BSMREF and BSSHBC are all low, then signal CPINTF is generated. Signal CPINTF is applied to a clock input of an interrupt identity register (IIR) 54 which then stores the data signals BSDT 0 through 15 via data bus 16-4 and driver 68 and also stores the address signals BSAD 16 through 23. Address signals BSAD 16 through 23 include the function code hexadecimal 03 and the two low order bits of the channel number. Signals BSDT 0-9 specifies the channel number of the source subsystem or device in the subsystem and signals BSDT 10-15 specify the interrupt level of the source.

Logic 76 also generates signal $\overline{\text{MBINTR}}$ which is active when low, as indicated by the horizontal line over the signal name. Signal $\overline{\text{MBINTR}}$ remains active until the bus acknowledge signal $\overline{\text{ACKMBI}}$ goes low. Signal $\overline{\text{MBINTR}}$ is applied to programmable array logic (PAL) 70 where it competes with other higher priority requests for access to CPU 2. Highest priority (7) is given to signal $\overline{\text{PWFAIL}}$ which when low indicates an imminent power failure. Next highest priority (6) is given to signal $\overline{\text{ATMROV}}$ which when low indicates that an accounting timer counted down to a preset value. Next highest priority (5) is given to signal $\overline{\text{TICKED}}$ which indicates that a real time clock reached a preset value. Next highest priority (3) is given signal $\overline{\text{DBINTR}}$ which indicates that an optional unit plugged into the NPE 3 is requesting an interrupt.

Lowest priority (1) is given signal $\overline{\text{MBINTR}}$ which generates signals $\overline{\text{IPL 2}}$ low, $\overline{\text{IPL 1}}$ low, and $\overline{\text{IPL 0}}$ high which are applied to CPU 2. If CPU 2 is not processing a higher priority command, then it acknowledges this command by applying to PAL 72 signals FCODE 0 thorugh 2, and address signals CPLA 12 through 15 which are all high to generate interrupt acknowledge signal $\overline{\text{CPINTA}}$ low. CPU 2 also generates the address strobe signal $\overline{\text{AS}}$ to generate signal CPINTA.

Signal CPINTA, as well as signals $\overline{\text{MBINTR}}$ and CPPA 28 through 30, are applied to PAL 74 to force signal $\overline{\text{ACKMBI}}$ low thereby forcing signal $\overline{\text{MBINTR}}$ high.

The interrupt command now has access to CPU 2. Signal $\overline{\text{CPINTA}}$ is applied to the logic 64 to generate an IIR register 54 output enable signal $\overline{\text{ENINTR}}$. The channel number stored in register IIR 54, signals CPDT 16-25 are then applied to the input address terminals of the interrupt vector display, random access memory 52, via data bus 8 and a multiplexer (MUX) 50. RAM 52 is made up of two 1024×4 bit random access memories which store the vectors. The function of these vectors is described in conjunction with FIG. 4. Signal $\overline{\text{CPINTA}}$ low applied to MUX 50 selects the data bus signals CPDT 16-25 during a RAM 52 read operation, and signal CPINTA high selects the address bus 6 signals CPLA 8-17 during a RAM 52 write operation.

RAM 52 is enabled by signal ENVECR low. Signal ENVECR is generated at address strobe time by either the load RAM signal LDVECR or the read RAM signal $\overline{\text{RDVECR}}$ or signal CPINTA and the physical address signals $\overline{\text{CPPA 28}}$, $\overline{\text{CPPA 29}}$ and CPPA 30.

Signals $\overline{\text{LDVECR}}$ or $\overline{\text{RDVECR}}$ are generated as shown in the Boolean equation during a non-interrupt operation.

Signal $\overline{\text{LDVECR}}$ is generated by PAL 56 and signal $\overline{\text{RDVECR}}$ is generated by PAL 58. Note that the data strobe signal DS controls the RAM 52 load timing.

PAL 58 also generates signal $\overline{\text{RDINTR}}$ address to RAM 52 during a supervisor data space cycle (FCODE 0, FCODE 1 and FCODE 2 equal to octal 5). The interrupts are processed during a CPU space cycle (FCODE 0, FCODE 1 and FCODE 2 equal to octal 7).

The following Boolean expressions describe the logic of the PAL's 56, 58, 62, 70, 72 and 74 and logic 64 and 76.

Interrupt Request to CPU 2 from System Bus 16
CPINTF = $\overline{BSAD\,8} \cdot \overline{BSAD\,9} \cdot ITSAME \cdot BSMREF \cdot BSSHBC$
MBINTR = CPINTF · ACKMBI
    $\overline{ACKMBI} = CPINTA \cdot \overline{CPPA\,28}; \overline{CPPA29};$
    CPPA30 · $\overline{MBINTR}$
    CPINTA = FCODE 2 · FCODE 1 · FCODE 0 ·
        CPLA 12 · CPLA 13 ·
        CPLA 14 · CPLA 15
    CPINTA = $\overline{CPINTA} \cdot \overline{AS}$
IPL2 = $\overline{PWFAIL} + \overline{ATMROV} + \overline{TICKED}$
IPL1 = $\overline{PWFAIL} + \overline{ATMROV} + (\overline{TICKED} \cdot \overline{DBINTR})$
IPL0 = $\overline{PWFAIL} + \overline{ATMROV} \cdot$
    ($\overline{TICKED} + \overline{DBINTR} + \overline{MBINTR}$)
    HHH - No Interrupt LLL - Top priority
    ITSAME = Channel number comparator
        $\overline{BSAD\,10} \cdot \overline{BSAD\,11} \cdot$
        $\overline{BSAD12} \cdot \overline{BSAD\,13} \cdot$
        BSAD 14 · BSAD 15 ·
        BSAD 16 · BSAD 17
        Channel Number (hexadecimal 0F)

Interrupt Vector Table 52
(Enable)
$\overline{ENVECR} = \overline{AS} \,(\overline{LDVECR} + \overline{RDVECR} +$
    $(\overline{CPINTA} \cdot \overline{CPPA\,28} \cdot$
    $\overline{CPPA\,29} \cdot CCPA\,30))$
(Load)
$\overline{LDVECR} = \overline{AS} \cdot R/W \cdot FCODE\,2 \cdot$
    $\overline{FCODE\,1} \cdot FCODE\,0 \cdot DS \cdot$
    CPLA 0 · CPLA 1 · CPLA 2 ·
    CPLA 3 · CPLA 4 ·
    CPLA 5 · $\overline{CPLA\,6}$ · CPLA 7
(Read)
$\overline{RDVECR} = \overline{AS} \cdot R/W \cdot FCODE\,2 \cdot \overline{FCODE\,1} \cdot$
    FCODE 0 · CPLA 0 · CPLA 1 ·
    CPLA 2 · CPLA 3 · $\overline{CPLA\,4}$ ·
    CPLA 5 · CPLA 6 · $\overline{CPLA\,7}$ Interrupt Indentify Register 54
(Load CPINTF
(Enable Output)
$\overline{ENINTR} = \overline{CPINTA} + \overline{RDINTR}$
$\overline{RDINTT} = \overline{AS} \cdot CPRDWR \cdot FCODE\,2 \cdot \overline{FCODE\,1} \cdot$
    FCODE 0 · CPLA 0 · CPLA 1 ·
    CPLA 2 · CPLA 3 · CPLA 4 ·
    $\overline{CPLA\,5}$ · CPLA 6 · CPLA 7

Figure 4:
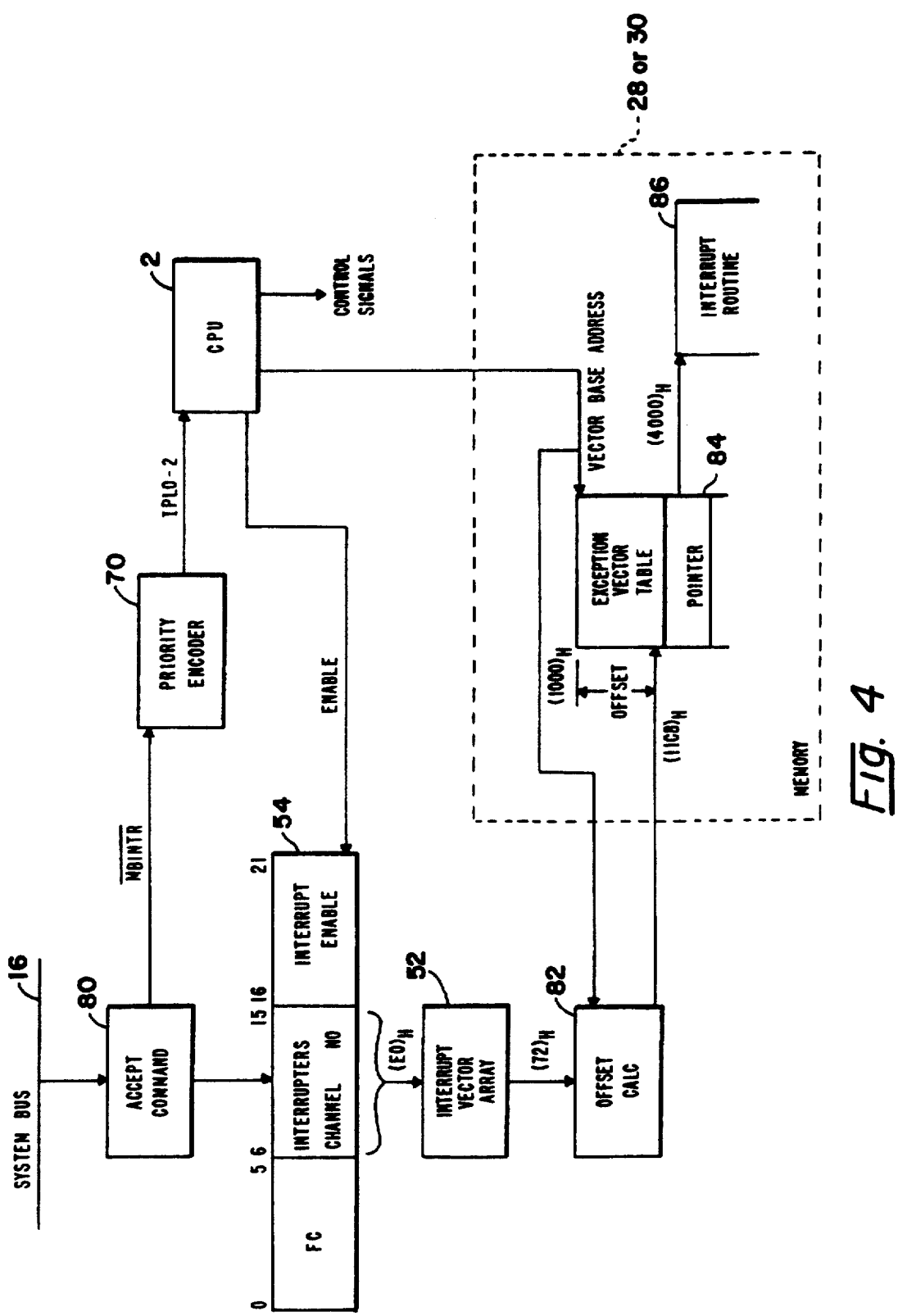
FIG. 4 is a flow diagram showing an example of the use of the invention.

FIG. 4 shows an example of the interrupt feature of the invention. The command is received in accept command 80 from system bus 16 and the function code, interruptor's channel number and the interrupt enable signals stored in the IIR register 54. Also interrupt signal $\overline{MBINTR}$ requests access to priority encoder 70. If no higher priority request is made of priority encoder 70, then IPL 0-2 at octal 1 requests access to the CPU 2. If CPU 2 is not executing a higher priority command than CPU 2 enables the output of IRR register 54.

Assuming the interruptor's channel number is hexadecimal E0 (1110 0000) then that location is addressed. Assume that hexadecimal 72 is stored in location hexadecimal E0, then that value is applied to offset calculator 82. The vector base address, hexadecimal 1000 is also applied to offset calculator 82. The vector base address is the starting address of an exception vector table 84 in memory 28 or 30. Offset calculator 82 adds the base address hexadecimal 1000 to the offset which is four times the contents of the addressed location in RAM 52 ($1000_H + 4$ ($72_H$) and the result, hexadecimal 11C8, is the location of the pointer to the interrupt routine 86 in memory 28 or 30. The contents of location hexadecimal 11C8 is, for example, hexadecimal 4000. Therefore the CPU2 will branch to location hexadecimal 4000 to start the execution of the interrupt routine.

While the invention has been shown and described with reference to the preferred embodiment thereof, it will be understood by those skilled in the art that the above and other changes in form and detail may be made therein without departing from the spirit and scope of the invention.

What is claimed is:

1. A data processing system comprising:
   a system bus; and
   a first subsystem and a plurality of second subsystems coupled to said bus, said bus providing a communication path on said bus for any one of said subsystems to transmit a communication to another of said subsystems,
   each of said second subsystems comprising means for generating and applying to said bus, for transmission to said first subsystem, a priority interrupt command for requesting a service to be performed by said first subsystem, said command comprising a function code denoting that the command is an interrupt command, an interrupt level denoting the relative urgency for the command to be executed by the first subsystem, and an identification number of said second subsystem;
   said first subsystem comprising:
      a register coupled to said bus for receiving said command from said bus and holding said command;
      first and second addressable stores, each of said stores having a plurality of uniquely addressable storage locations and responsive to the receipt of information representing an address of one of said locations to read out the contents of the addressed location;
      said first store concurrently holding a plurality of first address representations, each of said storage locations of said first store holding a respective one of said first address representations, each of said first address representations representing a relative address for accessing one of said storage locations of said second store;
      said second store concurrently holding a plurality of second address representations, each of said storage locations of said second store holding a respective one of said second address representations, each of said second address representations representing an address of the portion of system memory which holds a routine for servicing the interrupt requested by said command;
      a priority resolving means for comparing the interrupt level of the command held in said register with interrupt levels of other requests being made of said first subsystem and of the process currently being executed by a processor of said first subsystem and, if said interrupt level of said command represents a higher priority than the other interrupt levels with which it is compared, for generating a corresponding output signal;
      a logic circuit, enabled by said output signal, for applying said identification number of the command held in said register to said first store as an address of one of the storage locations thereof;

calculating means for combining the first address representation read out of said first store with a base address to generate an address of one of the storage locations of said second store;

means for applying the address generated by said calculating means to said second store, and means or employing the second address representation read out of said second store to access said system memory to obtain the respective routine.

2. The data processing system of claim 1, wherein:

said command further comprises the identification number of said first subsystem; and said register holds said function code, interrupt level and identification number of said second subsystem of the command received thereby.

3. The data processing system of claim 1, further comprising a third addressable store which functions as said system memory.

* * * * *